United States Patent [19]

Hirose

[11] Patent Number: 5,239,355

[45] Date of Patent: Aug. 24, 1993

[54] MICROSCOPIC SYSTEM FOR EXAMINATION OF CRYSTAL CLEAVAGE PLANE

[75] Inventor: Koji Hirose, Tokyo, Japan

[73] Assignee: NEC Corporation, Tokyo, Japan

[21] Appl. No.: 818,871

[22] Filed: Jan. 10, 1992

[30] Foreign Application Priority Data

Jan. 11, 1991 [JP] Japan .................................. 3-001817

[51] Int. Cl.⁵ ............................................ G01N 21/00
[52] U.S. Cl. .................................... 356/31; 250/201.3
[58] Field of Search ............... 356/31, 375; 250/201.3, 250/201.4, 201.8

[56] References Cited

FOREIGN PATENT DOCUMENTS 300707 12/1990 Japan .................................. 250/201.3

Primary Examiner—F. L. Evans
Attorney, Agent, or Firm—Leydig, Voit & Mayer

[57] ABSTRACT

An optical microscope equipped with an optical device allowing a convergent beam to irradiate the surface of a specimen through a microscope tube and an objective lens. The device detects the deviation of the convergent beam reflected from the surface of the specimen to an optical axis of the microscope. A driving mechanism moves the specimen in a three-dimensional direction to automatically eliminate the deviation. With this microscope, it is possible to position the specimen automatically, thus reducing the time for examination and improving precision of the examination.

6 Claims, 2 Drawing Sheets

FIG. I
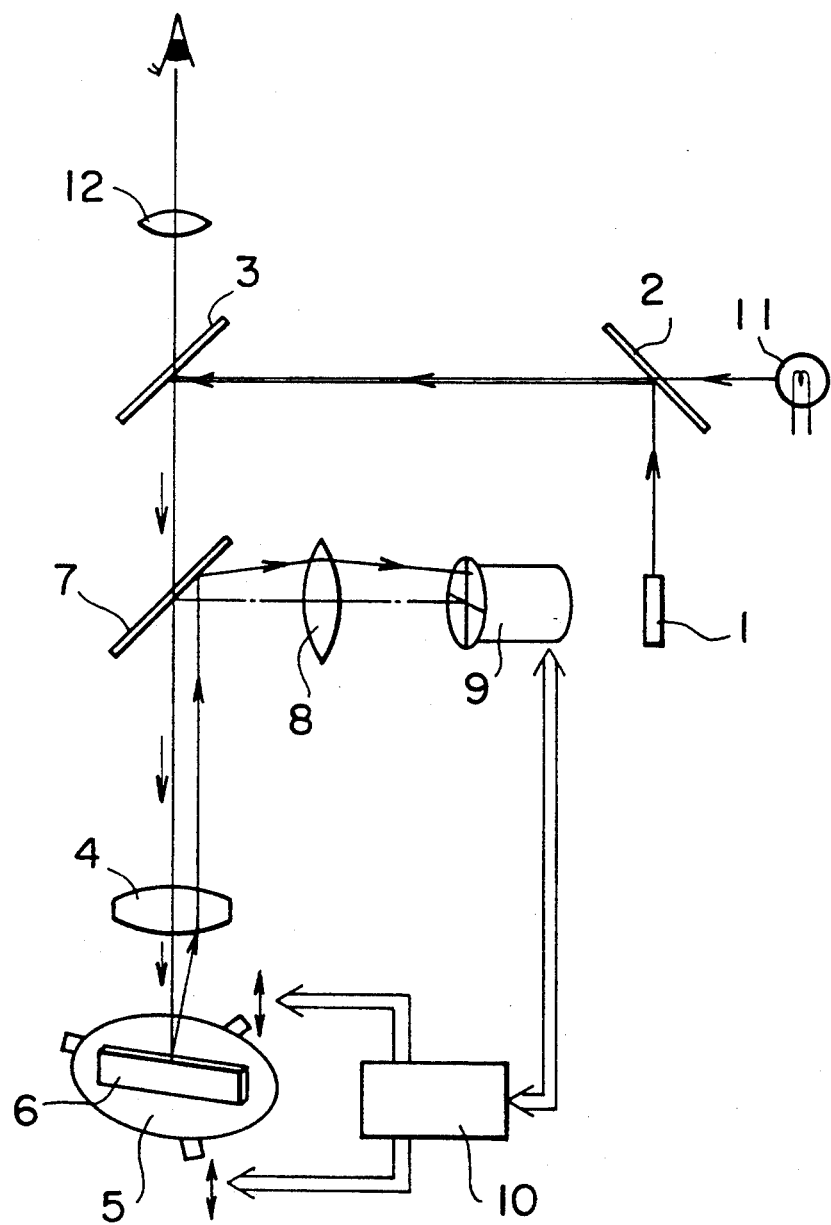

MICROSCOPIC SYSTEM FOR EXAMINATION OF CRYSTAL CLEAVAGE PLANE

BACKGROUND OF THE INVENTION

1. Field of the Invention

The present invention relates to a microscopic system for an examination of a crystal cleavage plane in semiconductor wafers, etc.

2. Description of the Prior Art

Recently, when producing a semiconductor device, various defects in products have been caused by crystal defects in the interior of silicon wafers. Specifically, it is known that the crystal defects in silicon wafers have a great influence on the yield in the diffusion process. Such crystal defects can be eliminated by controlling the initial oxygen concentration and the oxygen deposition in silicon. As a method for examining the crystal defects, the observation of a crystal cleavage plane in silicon wafers is considered to be important. For the examination of the crystal cleavage plane, an optical microscope is used. In a conventional method, a specimen was positioned by handwork using forceps or plastic clay so that a cleavage plane of the specimen becomes perpendicular to the optical axis of a microscope.

In the conventional method, every time the specimen was moved or focused on while using the microscope, the specimen needed to be repositioned by hand so that a cleavage plane of the specimen was perpendicular to the optical axis of the microscope. Disadvantageously it took much time (3-5 hours) and labor to do so. In addition, since it was difficult to hold the specimen so that the cleavage plane was precisely perpendicular to the optical axis of the microscope, the examination was not likely to be precise.

SUMMARY OF THE INVENTION

An object of the present invention is to solve the problem that the conventional microscopic system has when a microscopic examination of a crystal cleavage plane in semiconductor wafers, etc. is performed, more specifically, when a specimen is held in a microscope so that the crystal cleavage plane becomes perpendicular to the optical axis of the microscope.

In order to solve the above problem, a microscopic system for an examination of a crystal cleavage plane of the present invention comprises:

an optical means for allowing a convergent beam to irradiate the surface of a specimen through a microscope tube such as a body tube or binocular tube and an objective lens or objective lenses;

a detecting means for detecting the deviation of the above beam reflected from the surface of the specimen to the optical axis of the microscope; and a driving means for moving the specimen in a three-dimensional direction to automatically eliminate the above deviation.

BRIEF DESCRIPTION OF THE DRAWINGS

FIG. 1 is a diagram of one embodiment of the present invention.

DETAILED DESCRIPTION OF THE PREFERRED EMBODIMENT

Figure 2A:
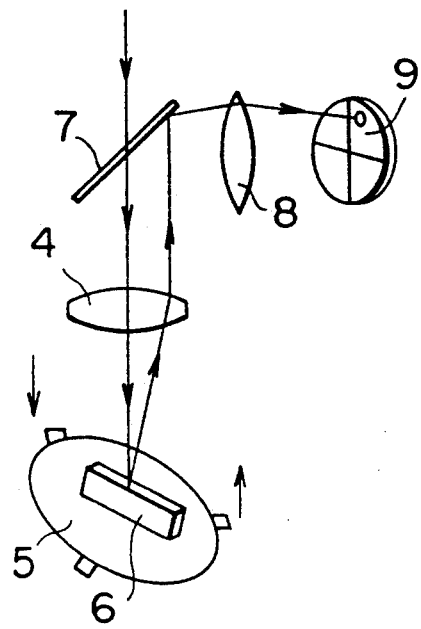
FIGS. 2 (a), (b) and (c) are diagrams showing how to operate a detecting mechanism in combination with a driving mechanism as shown in FIG. 1.

In an embodiment of the present invention as shown in FIG. 1, a microscopic system comprises a source 1 of a laser beam for detecting the deviation of a convergent beam reflected from the surface of a specimen to an optical axis of a microscope, half mirrors 2, 3 and 7 such as dichroic mirrors 2, 3, an objective lens 4, a specimen stage 5, a condenser lens 8, a position detector 9, a driving apparatus 10 for moving the specimen stage, a light source 11 for an examination with the naked eye, and an eyepiece 12.

In this embodiment, a laser beam originated from the laser beam source 1 is reflected by the half mirrors 2 and 3 and then the laser beam passes through the objective lens 4 to be focused on and reflected off a cleavage plane in the specimen 6 under examination which is placed on the stage 5 having the driving apparatus. The laser beam reflected from the cleavage plane passes back through the objective lens 4, is reflected off the half mirror 7, and is focused by the condenser lens 8 onto the position detector 9 to detect the deviation of the reflected beam from the cleavage plane to the optical axis of the microscope.

Furthermore, in the above embodiment, the position detector 9 signals the driving apparatus 10 to position the specimen by a three-dimensional movement of the stage 5 so that the detected deviation of the reflected beam from the cleavage plane to the optical axis of the microscope is eliminated. Incidentally, when there is no deviation of the beam reflected from the cleavage plane to the optical axis of the microscope, an illuminating light originating from the light source 11 is reflected by the half mirror 3. The reflected light passes through the objective lens 4 is focused on the cleavage plane of the specimen 6 on the stage 5, and then reflected back into the objective lens 4 by the cleavage plane. The reflected-back beam is magnified by the objective lens 4 to make an inverted real image. Consequently, the virtual image of the cleavage plane magnified by the eyepiece 12 is examined by the naked eye.

Figure 2B:
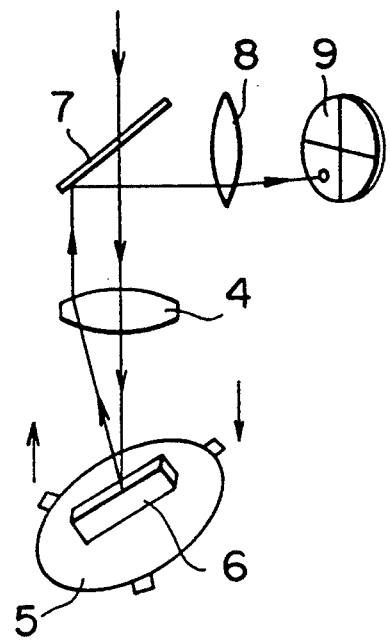
Figure 2C:
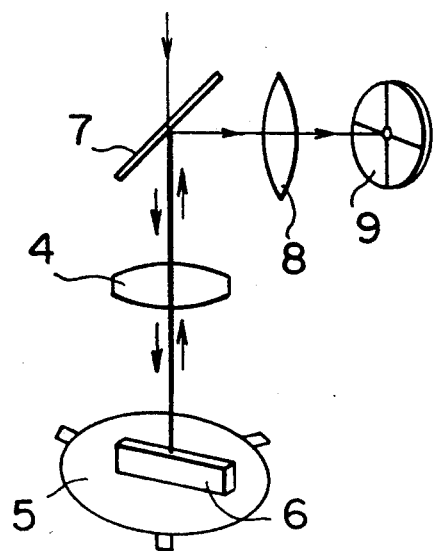

Referring now to FIG. 2, there are shown diagrams which illustrate how to operate the detecting mechanism and the driving mechanism. The laser beam reflected from the cleavage plane of the specimen 6 under examination is focused by the condenser lens 8 onto the position detector 9. As illustrated in FIGS. 2(a) and 2(b), the location of the laser beam or ray spot focused onto the position detector 9 changes depending on the inclination of the cleavage plane, that is, the reflection angle of the above laser beam to the cleavage plane. Using the position detector 9, the displacement of the location of the above ray spot from the center of the position detector 9 is detected. Then, a signal is given from the position detector 9 to the driving mechanism 10 so as to eliminate such a displacement, that is, so as to locate the above spot in the center of the position detector 9, whereby the stage 5 is driven until the spot is centered in the position detector 9, as illustrated in FIG. 2(c).

In the embodiment as described above, as optical means for irradiating or focusing a convergent beam which passes through the body tube and objective lens on the specimen, a laser beam is employed. However, the laser beam can be replaced by LED radiation or infrared radiation.

Incidentally, with respect to the position detector and the driving apparatus, conventionally well-known means can be employed. For example, a photodiode divided into four pieces can be used as the position detector and a tracking servomechanism, a focusing mechanism, etc. which are used for a compact disk, an optical disk, etc. can be used as the driving apparatus. The details are omitted from the above embodiment because these known means can be operated according to the conventional manner.

As explained hereinbefore, the microscopic system for an examination of a crystal cleavage plane of the present invention comprises: optical means for allowing a convergent beam to irradiate a crystal cleavage plane of a specimen on a stage through a microscope tube and objective lens; means for detecting the deviation of the beam reflected from the crystal cleavage plane to the optical axis of the microscope; and driving means for moving the specimen in a three-dimensional direction to automatically eliminate the above deviation, whereby the specimen is automatically positioned and held so that the crystal cleavage plane is always perpendicular to the optical axis of the microscope. Thus, it becomes possible to shorten the time for examining the crystal cleavage plane of semiconductor silicon wafers from 3-5 hours to about 1 hour and to reduce the labor to about ⅓, and moreover to improve the precision of the above examination.

What is claimed is:

1. A microscopic system for examination of a specimen having a crystal cleavage plane comprising:
    a source for providing a convergent beam;
    optical means, including a microscope tube and an objective lens, for allowing the convergent beam to irradiate a surface of the specimen through the objective lens and to reflect from the surface of the specimen back through the objective lens;
    detecting means for detecting a deviation of the convergent beam reflected from the surface of the specimen to the optical axis of the microscope; and
    driving means for moving the specimen in a three-dimensional direction to automatically eliminate said deviation.

2. A microscopic system for examination of a crystal cleavage plane as defined in claim 1 comprising:
    a light source providing an illuminating light for illuminating the specimen on a stage and wherein the optical means includes a first half mirror for transmitting the illuminating light from the light source and reflecting the convergent beam;
    a second half mirror for reflecting the illuminating light and the convergent beam received from the first half mirror; and
    a third half mirror for transmitting the convergent beam and illuminating light reflected from the second half mirror to the specimen and reflecting the convergent beam reflected from the specimen, said first, second, and third mirrors being disposed on a path of light between said light source and the objective lens.

3. A microscopic system for examination of a crystal cleavage plane as defined in claim 1
    wherein said detecting means
    includes a condenser lens and a position detector; and
    wherein said optical means includes:
        a first half mirror for reflecting the convergent beam; and
        a second half mirror for reflecting the convergent beam reflected from the surface of the specimen through the condenser lens to the position detector to detect said deviation, said second half mirror being disposed in the microscope tube between said objective lens and the first half mirror.

4. A microscopic system for examination of a crystal cleavage plane as defined in claim 1 wherein said detecting means includes a photodiode divided into four pieces.

5. A microscopic system for examination of a crystal cleavage plane as defined in claim 1 wherein said driving means includes a focusing mechanism.

6. A microscopic system for examination of a crystal cleavage plane as defined in claim 1 wherein said driving means includes a tracking mechanism.

* * * * *